(12) United States Patent
Subramanian et al.

(10) Patent No.: US 8,152,994 B2
(45) Date of Patent: Apr. 10, 2012

(54) PROCESS FOR UPGRADING ATMOSPHERIC RESIDUES

(75) Inventors: Anand Subramanian, Sugar Land, TX (US); Raymond Floyd, Katy, TX (US); Odette Eng, Sugar Land, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 187 days.

(21) Appl. No.: 11/965,031

(22) Filed: Dec. 27, 2007

(65) Prior Publication Data

US 2009/0166253 A1 Jul. 2, 2009

(51) Int. Cl.
*C10G 21/00* (2006.01)
*C10G 1/04* (2006.01)
*C10G 47/02* (2006.01)

(52) U.S. Cl. ........... 208/87; 208/45; 208/86; 208/92; 208/93; 208/108; 208/309

(58) Field of Classification Search .......... 208/86, 208/87, 309, 45, 92, 93, 108
See application file for complete search history.

(56) References Cited

U.S. PATENT DOCUMENTS

| | | | |
|---|---|---|---|
| 2,940,920 A | 6/1960 | Garwin | |
| 3,975,396 A | 8/1976 | Bushnell et al. | |
| 4,039,429 A | 8/1977 | van Klinken et al. | |
| 4,191,639 A | 3/1980 | Audeh et al. | |
| 4,200,519 A | 4/1980 | Kwant et al. | |
| 4,290,880 A | 9/1981 | Leonard | |
| 4,305,814 A * | 12/1981 | Leonard | 208/309 |
| 4,324,651 A | 4/1982 | Rollmann et al. | |
| 4,354,922 A | 10/1982 | Derbyshire et al. | |
| 4,354,928 A | 10/1982 | Audeh et al. | |
| 4,421,639 A | 12/1983 | Lambert et al. | |
| 4,440,633 A | 4/1984 | Jacquin et al. | |
| 4,482,453 A | 11/1984 | Coombs et al. | |
| 4,502,950 A | 3/1985 | Ikematsu et al. | |
| 4,525,269 A | 6/1985 | Ikematsu et al. | |
| 4,547,292 A | 10/1985 | Zarchy | |
| 4,810,367 A | 3/1989 | Chombart et al. | |
| 4,933,067 A | 6/1990 | Rankel | |
| 5,089,114 A | 2/1992 | Tovar et al. | |
| 5,192,421 A | 3/1993 | Audeh et al. | |
| 5,843,303 A | 12/1998 | Ganeshan | |
| 5,914,010 A | 6/1999 | Hood et al. | |
| 5,919,355 A | 7/1999 | Hood | |
| 6,274,032 B2 | 8/2001 | Hood et al. | |
| 6,332,975 B1 | 12/2001 | Abdel-Halim et al. | |
| 6,514,403 B1 * | 2/2003 | Louie et al. | 208/58 |
| 6,524,469 B1 | 2/2003 | Schucker | |
| 6,533,925 B1 | 3/2003 | Wallace et al. | |
| 7,144,498 B2 | 12/2006 | McCall et al. | |
| 2003/0000867 A1 * | 1/2003 | Reynolds | 208/89 |
| 2004/0069685 A1 * | 4/2004 | Inomata et al. | 208/211 |
| 2005/0006279 A1 * | 1/2005 | Gueret et al. | 208/86 |

* cited by examiner

*Primary Examiner* — Walter D Griffin
*Assistant Examiner* — Renee E Robinson
(74) *Attorney, Agent, or Firm* — KBR IP Legal Dept.

(57) ABSTRACT

Systems and methods for processing one or more hydrocarbons are provided. One or more hydrocarbon feedstocks can be selectively separated to provide one or more light deasphalted oils. At least a portion of the light deasphalted oil can be hydrocracked to provide one or more hydrocarbon products.

23 Claims, 3 Drawing Sheets

PROCESS FOR UPGRADING ATMOSPHERIC RESIDUES

BACKGROUND

1. Field

The present embodiments generally relate to processes for processing hydrocarbons. More particularly, embodiments of the present invention relate to processes for upgrading atmospheric residues using a solvent de-asphalting unit.

2. Description of the Related Art

Solvent de-asphalting ("SDA") processes have been used to treat residuum oil. Traditional refinery distillation processes separate light hydrocarbon compounds from incoming feedstocks, leaving a large volume of residuum ("residual oil") that is primarily heavy hydrocarbons. SDA processes have been used to treat the heavy hydrocarbons with a solvent to generate asphaltic and de-asphalted oil ("DAO") products. The asphaltic and DAO products are typically treated and/or processed into useful products.

DAO can be economically attractive when downstream treatment facilities such as hydrotreating or fluid catalytic cracking are adequately sized to process the large volume of DAO generated when treating residuum. However, hydrocracking the DAO requires a capital intensive, high-pressure, system to fractionate the large quantity of heavy hydrocarbons, especially when intermediate products such as diesel, gas oil or kerosene are preferred.

A need exists for an improved process to upgrade residuum hydrocarbons while minimizing capital investment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and methods for processing one or more hydrocarbons are provided. One or more hydrocarbons can be selectively separated to provide one or more light deasphalted oils. At least a portion of the light deasphalted oil can be cracked to provide one or more hydrocarbon products.

Figure 1:
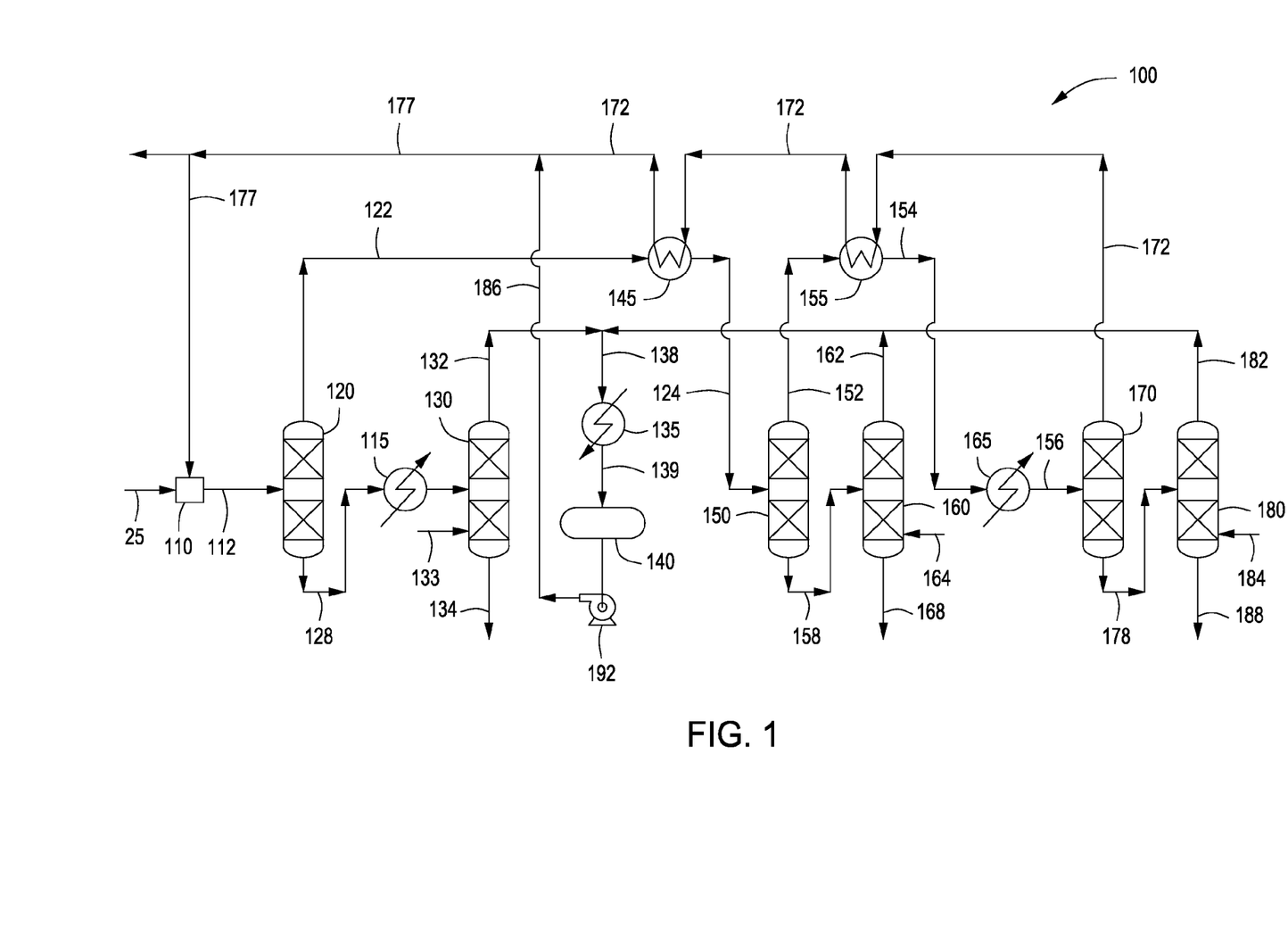
FIG. 1 depicts an illustrative extraction system according to one or more embodiments described.

FIG. 1 depicts an illustrative extraction system 100 according to one or more embodiments. The extraction system 100 can include one or more mixers 110, separators (three are shown 120, 150, 170) and strippers (three are shown 130, 160, 180) for the selective separation of the hydrocarbon mixture in line 112 into an asphaltene fraction via line 134, a heavy-DAO ("resin") fraction via line 168, and a light-DAO fraction via line 188. In one or more embodiments, the temperature of the contents of line 122 can be increased above the temperature in the asphaltene separator 120 to promote the separation of light-DAO and heavy-DAO fractions. In one or more embodiments, the separation of the DAO in line 122 into light and heavy fractions can be accomplished by increasing the temperature of the contents of line 122 above the critical temperature of the one or more solvents, i.e. to supercritical conditions based upon the solvent in line 122. At temperatures greater than the temperature in the asphaltene separator 120 including, but not limited to, supercritical conditions, the light-DAO and the heavy-DAO can be separated using the one or more separators 150. Any residual solvent can be stripped from the heavy-DAO using the stripper 160 to provide a heavy-DAO via line 168.

The term "light deasphalted oil" ("light-DAO") as used herein refers to a hydrocarbon or mixture of hydrocarbons sharing similar physical properties and containing less than 5%, 4%, 3%, 2% or 1% asphaltenes. In one or more embodiments, the similar physical properties can include a boiling point of about 315° C. (600° F.) to about 610° C. (1,130° F.); a viscosity of about 40 cSt to about 65 cSt at 50° C. (120° F.); and a flash point of about 130° C. (265° F.) or more.

The term "heavy deasphalted oil" ("heavy-DAO") as used herein refers to a hydrocarbon or mixture of hydrocarbons sharing similar physical properties and containing less than 5%, 4%, 3%, 2% or 1% asphaltenes. In one or more embodiments, the similar physical properties can include a boiling point of about 400° C. (750° F.) to about 800° C. (1,470° F.); a viscosity of about 50 cSt to about 170 cSt at 50° C. (120° F.); and a flash point of about 150° C. (300° F.) or more.

The term "deasphalted oil" ("DAO") as used herein refers to a mixture of light deasphalted and heavy deasphalted oils.

The term "solvent" and "solvents" as used herein refers to one or more alkanes or alkenes with three to seven carbon atoms ($C_3$ to $C_7$), mixtures thereof, derivatives thereof and combinations thereof. In one or more embodiments, the solvating hydrocarbon has a normal boiling point or bulk normal boiling point of less than 538° C. (1,000° F.).

In one or more embodiments, the feedstock via line 25 and one or more solvent(s) via line 177 can be mixed or otherwise combined using one or more mixers 110 to provide a hydrocarbon mixture ("first mixture") in line 112. In one or more embodiments, at least a portion of the feedstock in line 25 can be one or more unrefined and/or partially refined hydrocarbons including, but not limited to, atmospheric tower bottoms, vacuum tower bottoms, crude oil, oil shales, oil sands, tars, bitumens, combinations thereof, derivatives thereof and mixtures thereof. In one or more specific embodiments, the feedstock can include one or more atmospheric distillation tower bottoms that partially or completely bypass a vacuum distillation unit and are fed directly to the extraction system 100. In one or more embodiments, the feedstock can include one or more hydrocarbons that are insoluble in the one or more solvent(s) supplied via line 177. In one or more specific embodiments, the feedstock can have a specific gravity (at 60°) of less than 35° API, or more preferably less than 25° API.

In one or more embodiments, the flow of the one or more solvents in line 177 can be set to maintain a pre-determined solvent-to-feedstock weight ratio in line 112. The solvent-to-feedstock weight ratio can vary depending upon the physical properties and/or composition of the feedstock. For example, a high boiling point feedstock can require greater dilution with low boiling point solvent(s) to obtain the desired bulk boiling point for the resultant mixture. The hydrocarbon mixture in line 112 can have a solvent-to-feedstock dilution ratio of about 1:1 to about 100:1; about 2:1 to about 10:1; or about 3:1 to about 6:1. In one or more embodiments, the hydrocarbon mixture in line 112 can have a specific gravity (at 60° F.) of about –5° API to about 35° API; or about 6° API to about 20° API. The solvent concentration in the hydrocarbon mixture in line 112 can range from about 50% wt to about 99% wt; 60% wt to about 95% wt; or about 66% wt to about 86% wt solvent(s). The hydrocarbon mixture in line 112 can contain from about 1% wt to about 50% wt, from about 5% wt to about 40% wt, or from about 14% wt to about 34% wt feedstock.

The one or more mixers 110 can be any device or system suitable for batch, intermittent, and/or continuous mixing of the feedstock(s) and solvent(s). The mixer 110 can be capable of homogenizing immiscible fluids. Illustrative mixers can include but are not limited to ejectors, inline static mixers, inline mechanical/power mixers, homogenizers, or combinations thereof. The mixer 110 can operate at temperatures of about 25° C. (80° F.) to about 600° C. (1,110° F.); about 25° C. (80° F.) to about 500° C. (930° F.); or about 25° C. (80° F.) to about 300° C. (570° F.). The mixer 110 can operate at pressures of about 101 kPa (0 psig) to about 2,800 kPa (390 psig); about 101 kPa (0 psig) to about 1,400 kPa (190 psig); or about 101 kPa (0 psig) to about 700 kPa (90 psig). In one or more embodiments, the mixer 110 can operate at a pressure exceeding the operating pressure of the asphaltene separator 120 by a minimum of about 35 kPa (5 psig); about 70 kPa (10 psig); about 140 kPa (20 psig); or about 350 kPa (50 psig).

In one or more embodiments, the first mixture in line 112 can be introduced to the one or more separators ("asphaltene separators") 120 to provide an overhead via line 122 and a bottoms via line 128. The overhead ("second mixture") in line 122 can contain deasphalted oil ("DAO") and a first portion of the one or more solvent(s). The bottoms in line 128 can contain insoluble asphaltenes and the balance of the one or more solvent(s). In one or more embodiments, the DAO concentration in line 122 can range from about 1% wt to about 50% wt; about 5% wt to about 40% wt; or about 14% wt to about 34% wt. In one or more embodiments, the solvent concentration in line 122 can range from about 50% wt to about 99% wt; about 60% wt to about 95% wt; or about 66% wt to about 86% wt. In one or more embodiments, the density (at 60° F.) of the overhead in line 122 can range from about 100° API; about 30° API to about 100° API; or about 50° API to about 100° API.

The term "asphaltenes" as used herein refers to a hydrocarbon or mixture of hydrocarbons that are insoluble in n-alkanes, yet is totally or partially soluble in aromatics such as benzene or toluene.

In one or more embodiments, the asphaltene concentration in the bottoms in line 128 can range from about 10% wt to about 99% wt; about 30% wt to about 95% wt; or about 50% wt to about 90% wt. In one or more embodiments, the solvent concentration in line 128 can range from about 1% wt to about 90% wt; about 5% wt to about 70% wt; or about 10% wt to about 50% wt.

The one or more separators 120 can include any system or device suitable for separating one or more asphaltenes from the hydrocarbon feed and solvent mixture to provide the overhead in line 122 and the bottoms in line 128. In one or more embodiments, the separator 120 can contain bubble trays, packing elements such as rings or saddles, structured packing, or combinations thereof. In one or more embodiments, the separator 120 can be an open column without internals. In one or more embodiments, the separators 120 can operate at a temperature of about 15° C. (60° F.) to about 150° C. (270° F.) above the critical temperature of the one or more solvent(s) ("$T_{C,S}$"); about 15° C. (60° F.) to about $T_{C,S}$+100° C. ($T_{C,S}$+180° F.); or about 15° C. (60° F.) to about $T_{C,S}$+50° C. ($T_{C,S}$+90° F.). In one or more embodiments, the separators 120 can operate at a pressure of about 101 kPa (0 psig) to about 700 kPa (100 psig) above the critical pressure of the solvent(s) ("$P_{C,S}$"); about $P_{C,S}$–700 kPa ($P_{C,S}$–100 psig) to about $P_{C,S}$+700 kPa ($P_{C,S}$+100 psig); or about $P_{C,S}$–300 kPa ($P_{C,S}$–45 psig) to about $P_{C,S}$+300 kPa ($P_{C,S}$+45 psig).

In one or more embodiments, the bottoms in line 128 can be heated using one or more heat exchangers 115, introduced to one or more strippers 130, and selectively separated therein to provide an overhead via line 132 and a bottoms via line 134. In one or more embodiments, the overhead via line 132 can contain a first portion of one or more solvent(s), and the bottoms in line 134 can contain a mixture of insoluble asphaltenes and the balance of the one or more solvent(s). In one or more embodiments, steam, via line 133, can be added to the stripper to enhance the separation of the one or more solvents from the asphaltenes. In one or more embodiments, the steam in line 133 can be at a pressure ranging from about 200 kPa (15 psig) to about 2,160 kPa (300 psig); from about 300 kPa (30 psig) to about 1,475 kPa (200 psig); or from about 400 kPa (45 psig) to about 1,130 kPa (150 psig). In one or more embodiments, the bottoms in line 128 can be heated to a temperature of about 100° C. (210° F.) to about $T_{C,S}$+150° C. ($T_{C,S}$+270° F.); about 150° C. (300° F.) to about $T_{C,S}$+100° C. ($T_{C,S}$+180° F.); or about 300° C. (570° F.) to about $T_{C,S}$+50° C. ($T_{C,S}$+90° F.) using one or more heat exchangers 115. In one or more embodiments, the solvent concentration in the overhead in line 132 can range from about 70% wt to about 99% wt; or about 85% wt to about 99% wt. In one or more embodiments, the DAO concentration in the overhead in line 132 can range from about 0% wt to about 50% wt; about 1% wt to about 30% wt; or about 1% wt to about 15% wt.

In one or more embodiments, the solvent concentration in the bottoms in line 134 can range from about 5% wt to about 80% wt; about 20% wt to about 60% wt; or about 25% wt to about 50% wt. In one or more embodiments, at least a portion of the bottoms in line 134 can be further processed, dried and pelletized to provide a solid hydrocarbon product. In one or more embodiments, at least a portion of the bottoms in line 134 can be subjected to further processing, including but not limited to gasification, power generation, process heating, or combinations thereof. In one or more embodiments, at least a portion of the bottoms in line 134 can be sent to a gasifier to produce steam, power, and hydrogen. In one or more embodiments, at least a portion of the bottoms in line 134 can be used as fuel to produce steam and power. In one or more embodiments, the asphaltene concentration in the bottoms in line 134 can range from about 20% wt to about 95% wt; about 40% wt to about 80% wt; or about 50% wt to about 75% wt. In one or more embodiments, the specific gravity (at 60° F.) of the bottoms in line 134 can range from about 5° API to about 30° API; about 5° API to about 20° API; or about 5° API to about 15° API.

The one or more heat exchangers 115 can include any system or device suitable for increasing the temperature of the bottoms in line 128. Illustrative heat exchangers, systems or devices can include, but are not limited to, shell-and-tube, plate and frame, or spiral wound heat exchanger designs. In one or more embodiments, a heating medium such as steam, hot oil, hot process fluids, electric resistance heat, hot waste fluids, or combinations thereof can be used to transfer the necessary heat to the bottoms in line 128. In one or more embodiments, the one or more heat exchangers 115 can be a direct fired heater or the equivalent. In one or more embodiments, the one or more heat exchangers 115 can operate at a temperature of about 25° C. (80° F.) to about $T_{C,S}$+150° C. ($T_{C,S}$+270° F.); about 25° C. (80° F.) to about $T_{C,S}$+100° C. ($T_{C,S}$+180° F.); or about 25° C. (80° F.) to about $T_{C,S}$+50° C. ($T_{C,S}$+90° F.). In one or more embodiments, the one or more heat exchangers 115 can operate at a pressure of about 100 kPa (0 psig) to about $P_{C,S}$+700 kPa ($P_{C,S}$+100 psig); about 100 kPa to about $P_{C,S}$+500 kPa ($P_{C,S}$+75 psig); or about 100 kPa to about $P_{C,S}$+300 kPa ($P_{C,S}$+45 psig).

The one or more asphaltene strippers 130 can include any system or device suitable for selectively separating the bottoms in line 128 to provide an overhead in line 132 and a bottoms in line 134. In one or more embodiments, the asphaltene stripper 130 can contain internals such as rings, saddles, balls, irregular sheets, tubes, spirals, trays, baffles, or the like, or any combinations thereof. In one or more embodiments, the asphaltene stripper 130 can be an open column without internals. In one or more embodiments, the one or more asphaltene strippers 130 can operate at a temperature of about 30° C. (85° F.) to about 600° C. (1,110° F.); about 100° C. (210° F.) to about 550° C. (1,020° F.); or about 300° C. (570° F.) to about 550° C. (1,020° F.). In one or more embodiments, the one or more asphaltene strippers 130 can operate at a pressure of about 100 kPa (0 psig) to about 4,000 kPa (565 psig); about 500 kPa (60 psig) to about 3,300 kPa (465 psig); or about 1,000 kPa (130 psig) to about 2,500 kPa (350 psig).

In one or more embodiments, the asphaltene stripper overhead in line 122 can be heated using one or more heat exchangers 145 to sub-critical, critical or super-critical conditions based upon the critical temperature of the one or more solvents, providing a heated overhead in line 124. In one or more embodiments, the heated overhead in line 124 can be at a temperature in excess of the critical temperature of the solvent thereby enhancing the separation of the DAO into a heterogeneous mixture containing a light-DAO fraction and a heavy-DAO fraction in the one or more separators 150. In one or more embodiments, the temperature of the heated overhead in line 124 can range from about 15° C. (60° F.) to about $T_{C,S}$+150° C. ($T_{C,S}$+270° F.); about 15° C. (60° F.) to about $T_{C,S}$+100° C. ($T_{C,S}$+210° F.); or about 15° C. (60° F.) to about $T_{C,S}$+50° C. ($T_{C,S}$+90° F.).

Within the one or more separators 150, the heated overhead in line 124 can fractionate into a heavy-DAO fraction and a light-DAO fraction. The heavy-DAO fraction, withdrawn as a bottoms via line 158, can contain at least a portion of the heavy-DAO and a first portion of the one or more solvents. The light-DAO fraction, withdrawn as an overhead ("third mixture") via line 152, can contain at least a portion of the light-DAO and the balance of the one or more solvents. In one or more embodiments, the light-DAO concentration in the overhead in line 152 can range from about 1% wt to about 50% wt; about 5% wt to about 40% wt; or about 10% wt to about 30% wt. In one or more embodiments, the solvent concentration in the overhead in line 152 can range from about 50% wt to about 99% wt; about 60% wt to about 95% wt; or about 70% wt to about 90% wt. In one or more embodiments, the overhead in line 152 can contain less than about 20% wt heavy-DAO; less than about 10% wt heavy-DAO; or less than about 5% wt heavy-DAO.

In one or more embodiments, the heavy-DAO concentration in the bottoms in line 158 can range from about 10% wt to about 90% wt; about 25% wt to about 80% wt; or about 40% wt to about 70% wt. In one or more embodiments, the solvent concentration in the bottoms in line 158 can range from about 10% wt to about 90% wt; about 20% wt to about 75% wt; or about 30% wt to about 60% wt.

The one or more separators 150 can include any system or device suitable for separating the heated overhead in line 124 to provide an overhead via line 152 and a bottoms via line 158. In one or more embodiments, the separator 150 can include one or more multi-staged extractors having alternate segmental baffle trays, packing, perforated trays or the like, or combinations thereof. In one or more embodiments, the separator 150 can be an open column without internals. In one or more embodiments, the temperature in the one or more separators 150 can range from about 15° C. (60° F.) to about $T_{C,S}$+150° C. ($T_{C,S}$+270° F.); about 15° C. (60° F.) to about $T_{C,S}$+100° C. ($T_{C,S}$+210° F.); or about 15° C. (60° F.) to about $T_{C,S}$+50° C. ($T_{C,S}$+90° F.). In one or more embodiments, the pressure in the one or more separators 150 can range from about 100 kPa (0 psig) to about $P_{C,S}$+700 kPa ($P_{C,S}$+90 psig); about $P_{C,S}$−700 kPa ($P_{C,S}$−90 psig) to about $P_{C,S}$+700 kPa ($P_{C,S}$+90 psig); or about $P_{C,S}$−300 kPa ($P_{C,S}$−30 psig) to about $P_{C,S}$+300 kPa ($P_{C,S}$+30 psig).

The bottoms in line 158, containing heavy-DAO and the first portion of the one or more solvents, can be introduced into the one or more strippers 160 and selectively separated therein to provide an overhead, containing solvent, via line 162 and a bottoms, containing heavy-DAO, via line 168. The overhead in line 162 can contain a first portion of the solvent, and the bottoms in line 168 can contain heavy-DAO and the balance of the solvent. In one or more embodiments, steam via line 164 can be added to the stripper 160 to enhance the separation of solvent and the heavy-DAO therein. In one or more embodiments, at least a portion of the bottoms in line 168, containing heavy-DAO, can be directed for further processing including, but not limited to, upgrading through hydrotreating, catalytic cracking, or any combination thereof. In one or more embodiments, the steam in line 164 can be at a pressure ranging from about 200 kPa (15 psig) to about 2,160 kPa (300 psig); from about 300 kPa (30 psig) to about 1,475 kPa (200 psig); or from about 400 kPa (45 psig) to about 1,130 kPa (150 psig). In one or more embodiments, the solvent concentration in the overhead in line 162 can range from about 50% wt to about 100% wt; about 70% wt to about 99% wt; or about 85% wt to about 99% wt. In one or more embodiments, the heavy-DAO concentration in the overhead in line 162 can range from about 0% wt to about 50% wt; about 1% wt to about 30% wt; or about 1% wt to about 15% wt.

In one or more embodiments, the heavy-DAO concentration in the bottoms in line 168 can range from about 20% wt to about 95% wt; about 40% wt to about 80% wt; or about 50% wt to about 75% wt. In one or more embodiments, the solvent concentration in the bottoms in line 168 can range from about 5% wt to about 80% wt; about 20% wt to about 60% wt; or about 25% wt to about 50% wt. In one or more embodiments, the API gravity of the bottoms in line 168 can range from about 5° API to about 30° API; about 5° API to about 20° API; or about 5° API to about 15° API.

The one or more strippers 160 can include any system or device suitable for separating heavy-DAO and the one or more solvents to provide an overhead via line 162 and a bottoms via line 168. In one or more embodiments, the stripper 160 can contain internals such as rings, saddles, structured packing, balls, irregular sheets, tubes, spirals, trays, baffles, or any combinations thereof. In one or more embodiments, the stripper 160 can be an open column without internals. In one or more embodiments, the operating temperature of the one or more strippers 160 can range from about 15° C. (60° F.) to about 600° C. (1,110° F.); about 15° C. (60° F.) to about 500° C. (930° F.); or about 15° C. (60° F.) to about 400° C. (750° F.). In one or more embodiments, the pressure of the one or more strippers 160 can range from about 100 kPa (0 psig) to about 4,000 kPa (565 psig); about 500 kPa (60 psig) to about 3,300 kPa (465 psig); or about 1,000 kPa (130 psig) to about 2,500 kPa (350 psig).

In one or more embodiments, the overhead in line 152 can be heated using one or more first-stage heat exchangers 155 and one or more second-stage heat exchangers 165 to provide a heated overhead via line 154. The temperature of the heated overhead in line 154 can range from about 15° C. (60° F.) to about $T_{C,s}$+150° C. ($T_{C,s}$+270° F.); about 15° C. (60° F.) to about $T_{C,s}$+100° C. ($T_{C,s}$+180° F.); or about 15° C. (60° F.) to about $T_{C,s}$+50° C. ($T_{C,s}$+90° F.).

The one or more first stage heat exchangers 155 can include any system or device suitable for increasing the temperature of the overhead in line 152 to provide a heated overhead in line 154. In one or more embodiments, the temperature in the first stage heat exchanger 155 can range from about 15° C. (60° F.) to about $T_{C,s}$+150° C. ($T_{C,s}$+270° F.); about 15° C. (60° F.) to about $T_{C,s}$+100° C. ($T_{C,s}$+180° F.); or about 15° C. (60° F.) to about $T_{C,s}$+50° C. ($T_{C,s}$+90° F.). In one or more embodiments, the first stage heat exchanger 155 can operate at a pressure of about 100 kPa (0 psig) to about $P_{C,s}$+700 kPa ($P_{C,s}$+100 psig); about 100 kPa (0 psig) to about $P_{C,s}$+500 kPa ($P_{C,s}$+75 psig); or about 100 kPa (0 psig) to about $P_{C,s}$+300 kPa ($P_{C,s}$+45 psig).

The one or more second stage heat exchangers 165 can include any system or device suitable for increasing the temperature of the heated overhead in line 154. In one or more embodiments, the second stage heat exchangers 165 can operate at a temperature of about from about 15° C. (60° F.) to about $T_{C,s}$+150° C. ($T_{C,s}$+270° F.); about 15° C. (60° F.) to about $T_{C,s}$+100° C. ($T_{C,s}$+180° F.); or about 15° C. (60° F.) to about $T_{C,s}$+50° C. ($T_{C,s}$+90° F.). In one or more embodiments, the second stage heat exchangers 165 can operate at pressures of about 100 kPa (0 psig) to about $P_{C,s}$+700 kPa ($P_{C,s}$+100 psig); about 100 kPa (0 psig) to about $P_{C,s}$+500 kPa ($P_{C,s}$+75 psig); or about 100 kPa (0 psig) to about $P_{C,s}$+300 kPa ($P_{C,s}$+45 psig).

In one or more embodiments, the heated overhead in line 156 can be introduced to the one or more separators 170 and selectively separated therein to provide an overhead via line 172 and a bottoms via line 178. In one or more embodiments, the overhead in line 172 can contain at least a portion of the one or more solvent(s), and the bottoms in line 178 can contain a mixture of light-DAO and the balance of the one or more solvent(s). In one or more embodiments, the solvent concentration in line 172 can range from about 50% wt to about 100% wt; about 70% wt to about 99% wt; or about 85% wt to about 99% wt. In one or more embodiments, the light-DAO concentration in line 172 can range from about 0% wt to about 50% wt; about 1% wt to about 30% wt; or about 1% wt to about 15% wt.

In one or more embodiments, the light-DAO concentration in the bottoms in line 178 can range from about 10% wt to about 90% wt; about 25% wt to about 80% wt; or about 40% wt to about 70% wt. In one or more embodiments, the solvent concentration in line 178 can range from about 10% wt to about 90% wt; about 20% wt to about 75% wt; or about 30% wt to about 60% wt.

The one or more separators 170 can include any system or device suitable for separating the heated overhead in line 156 to provide an overhead containing solvent via line 172 and a light-DAO rich bottoms via line 178. In one or more embodiments, the separator 170 can include one or more multi-staged extractors having alternate segmental baffle trays, packing, structured packing, perforated trays, and combinations thereof. In one or more embodiments, the separator 170 can be an open column without internals. In one or more embodiments, the separators 170 can operate at a temperature of about 15° C. (60° F.) to about $T_{C,s}$+150° C. ($T_{C,s}$+270° F.); about 15° C. (60° F.) to about $T_{C,s}$+150° C. ($T_{C,s}$+270° F.); or about 15° C. (60° F.) to about $T_{C,s}$+50° C. ($T_{C,s}$+90° F.). In one or more embodiments, the separators 170 can operate at a pressure of about 100 kPa (0 psig) to about $P_{C,s}$+700 kPa ($P_{C,s}$+100 psig); about $P_{C,s}$−700 kPa ($P_{C,s}$−100 psig) to about $P_{C,s}$+700 kPa ($P_{C,s}$+100 psig); or about $P_{C,s}$−300 kPa ($P_{C,s}$−45 psig) to about $P_{C,s}$+300 kPa ($P_{C,s}$+45 psig).

In one or more embodiments, the bottoms, containing light-DAO, in line 178 can be introduced into the one or more strippers 180 and selectively separated therein to provide an overhead via line 182 and a bottoms via line 188. In one or more embodiments, the overhead in line 182 can contain at least a portion of the one or more solvent(s), and the bottoms in line 188 can contain a mixture of light-DAO and the balance of the one or more solvent(s). In one or more embodiments, steam via line 184 can be added to the stripper 180 to enhance the separation of the one or more solvents from the light-DAO. In one or more embodiments, at least a portion of the light-DAO in line 188 can be directed for further processing including, but not limited to hydrocracking. In one or more embodiments, the steam in line 184 can be at a pressure ranging from about 200 kPa (15 psig) to about 2,160 kPa (300 psig); from about 300 kPa (30 psig) to about 1,475 kPa (200 psig); or from about 400 kPa (45 psig) to about 1,130 kPa (150 psig). In one or more embodiments, the solvent concentration in the overhead in line 182 can range from about 50% wt to about 100% wt; about 70% wt to about 99% wt; or about 85% wt to about 99% wt. In one or more embodiments, the light-DAO concentration in line 182 can range from about 0% wt to about 50% wt; about 1% wt to about 30% wt; or about 1% wt to about 15% wt.

In one or more embodiments, the light-DAO concentration in the bottoms in line 188 can range from about 20% wt to about 95% wt; about 40% wt to about 90% wt; or about 50% wt to about 85% wt. In one or more embodiments, the solvent concentration in line 188 can range from about 5% wt to about 80% wt; about 10% wt to about 60% wt; or about 15% wt to about 50% wt. In one or more embodiments, the API gravity of the bottoms in line 188 can range from about 10° API to about 60° API; about 20° API to about 50° API; or about 25° API to about 45° API.

In one or more embodiments, the one or more strippers 180 can contain internals such as rings, saddles, structured packing, balls, irregular sheets, tubes, spirals, trays, baffles, or any combinations thereof. In one or more embodiments, the stripper 180 can be an open column without internals. In one or more embodiments, the one or more strippers 180 can operate at a temperature of about 15° C. (60° F.) to about $T_{C,s}$+150° C. ($T_{C,s}$+270° F.); about 15° C. (60° F.) to about $T_{C,s}$+100° C. ($T_{C,s}$+210° F.); or about 15° C. (60° F.) to about $T_{C,s}$+50° C. ($T_{C,s}$+90° F.). In one or more embodiments, the one or more strippers 180 can operate at a pressure of about 100 kPa (0 psig) to about $P_{C,S}$+700 kPa ($P_{C,S}$+100 psig); about $P_{C,S}$−700 kPa ($P_{C,S}$−100 psig) to about $P_{C,S}$+700 kPa ($P_{C,S}$+100 psig); or about $P_{C,S}$−300 kPa ($P_{C,S}$−45 psig) to about $P_{C,S}$+300 kPa ($P_{C,S}$+45 psig).

In one or more embodiments, at least a portion of the overhead in line 172 can be cooled using one or more heat exchangers 145 and 155 to provide a cooled overhead via line 172. In one or more embodiments, about 1% wt to about 95% wt; about 5% wt to about 55% wt; or about 1% wt to about 25% wt of overhead in line 172 can be cooled using one or more heat exchangers 145, 155. Recycling at least a portion of the solvent to the solvent deasphalting depicted in FIG. 1 can decrease the quantity of fresh solvent make-up required. In one or more embodiments, prior to introduction to the one or more heat exchangers 155, the overhead in line 172 can be at a temperature of about 15° C. (60° F.) to about $T_{C,S}$+150° C. ($T_{C,S}$+270° F.); about 15° C. (60° F.) to about $T_{C,S}$+150° C. ($T_{C,S}$+270° F.); or about 15° C. (60° F.) to about $T_{C,S}$+50° C. ($T_{C,S}$+90° F.). In one or more embodiments, the overhead in line 172 can be at a pressure of about 100 kPa (0 psig) to about $P_{C,S}$+700 kPa ($P_{C,S}$+100 psig); about $P_{C,S}$−700 kPa ($P_{C,S}$−100 psig) to about $P_{C,S}$+700 kPa ($P_{C,S}$+100 psig); or about $P_{C,S}$−300 kPa ($P_{C,S}$−45 psig) to about $P_{C,S}$+300 kPa ($P_{C,S}$+45 psig).

In or more embodiments, at least a portion of the solvent in the overhead in lines 132, 162 and 182 can be combined to provide a combined solvent in the overhead in line 138. In one or more embodiments, the solvent in the combined solvent overhead in line 138 can be present as a two phase liquid/vapor mixture. In one or more embodiments, the combined solvent overhead in line 138 can be fully condensed using one or more condensers 135 to provide a condensed solvent via line 139. In one or more embodiments, the condensed solvent in line 139 can be stored or accumulated using one or more accumulators 140. The solvent(s) stored in the one or more accumulators 140 for recycle within the extraction unit 100 can be transferred using one or more solvent pumps 192 and recycle line 186.

In one or more embodiments, the combined solvent overhead in line 138 can have a temperature of about 30° C. (85° F.) to about 600° C. (1,110° F.); about 100° C. (210° F.) to about 550° C. (1,020° F.); or about 300° C. (570° F.) to about 550° C. (1,020° F.). In one or more embodiments, the condensed solvent in line 139 can have a temperature of about 10° C. (50° F.) to about 400° C. (750° F.); about 25° C. (80° F.) to about 200° C. (390° F.); or about 30° C. (85° F.) to 100° C. (210° F.). The solvent concentration in line 139 can range from about 80% wt to about 100% wt; about 90% wt to about 99% wt; or about 95% wt to about 99% wt.

The one or more condensers 135 can include any system or device suitable for decreasing the temperature of the combined solvent overhead in line 138. In one or more embodiments, condenser 135 can include, but is not limited to liquid or air cooled shell-and-tube, plate and frame, fin-fan, or spiral wound cooler designs. In one or more embodiments, a cooling medium such as water, refrigerant, air, or combinations thereof can be used to remove the necessary heat from the combined solvent overhead in line 138. In one or more embodiments, the one or more condensers 135 can operate at a temperature of about −20° C. (−5° F.) to about $T_{C,S}$° C.; about −10° C. (15° F.) to about 300° C. (570° F.); or about 0° C. (30° F.) to about 300° C. (570° F.). In one or more embodiments, the one or more coolers 175 can operate at a pressure of about 100 kPa (0 psig) to about $P_{C,S}$+700 kPa ($P_{C,S}$+100 psig); about 100 kPa (0 psig) to about $P_{C,S}$+500 kPa ($P_{C,S}$+75 psig); or about 100 kPa (0 psig) to about $P_{C,S}$+300 kPa ($P_{C,S}$+45 psig).

In one or more embodiments, all or a portion of the solvent in line 186 and all or a portion of the cooled solvent in line 172 can be combined to provide the solvent recycle via line 177. In one or more embodiments, at least a portion of the solvent recycle in line 177 can be recycled to the one or more mixers 110. Although not shown in FIG. 1, in one or more embodiments, at least a portion of the solvent in line 177 can be directed to another treatment process, for example an integrated solvent dewatering/deasphalting process.

Figure 2:
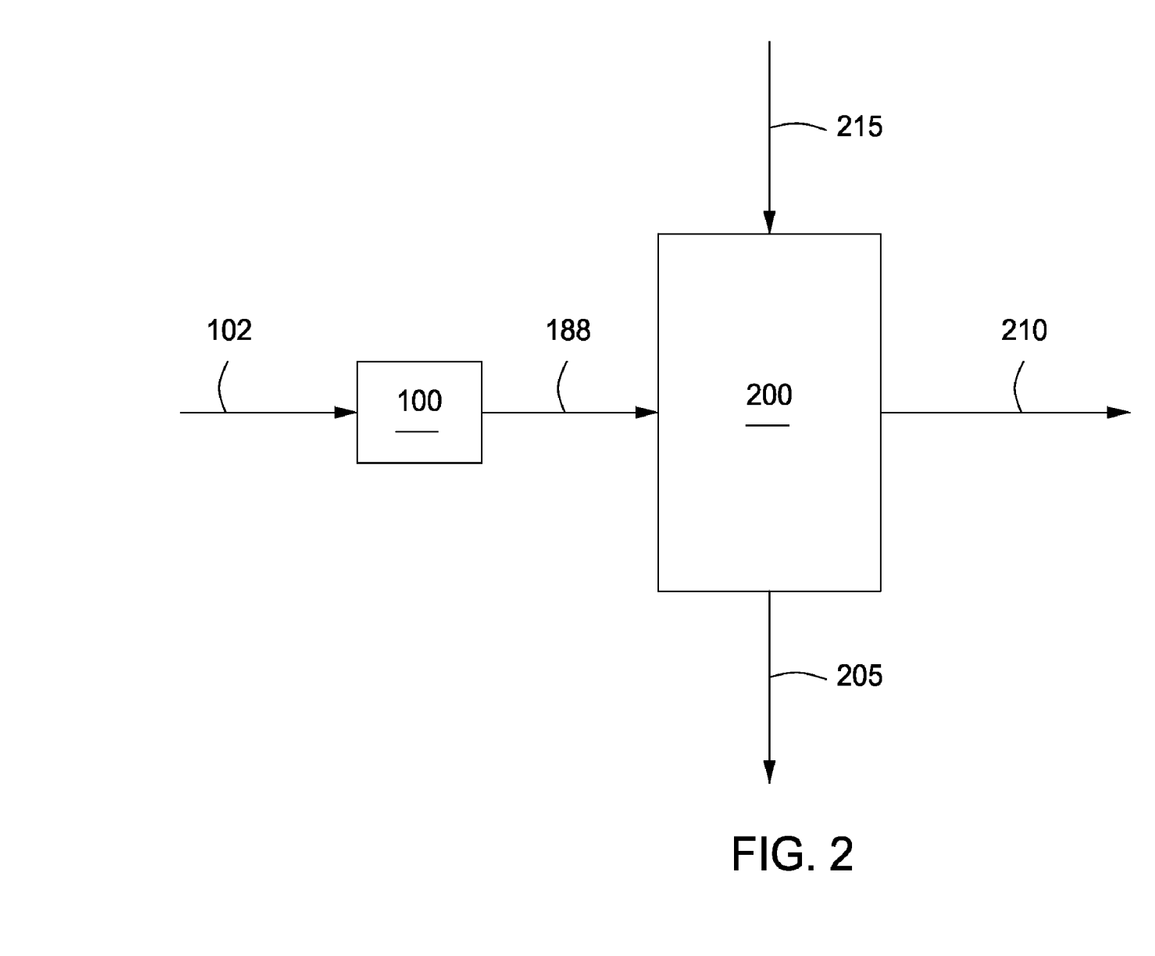
FIG. 2 depicts an illustrative treatment system for hydrocracking one or more hydrocarbons according to one or more embodiments described.

FIG. 2 depicts an illustrative treatment system for hydrocracking one or more hydrocarbons according to one or more embodiments. The illustrative treatment system depicted in FIG. 2 can be used for hydrocracking one or more light hydrocarbons, for example the light-DAO in line 188, produced using a three-stage solvent extraction system as depicted in FIG. 1. The use of a light-DAO can maximize the production of kerosene, diesel, gas oil, gasoline, combinations thereof, derivatives thereof or mixtures thereof using one or more hydrocrackers 200.

In one or more embodiments, hydrogen via line 215 and the light-DAO via line 188 can be introduced to the one or more hydrocrackers 200. The size of the one or more hydrocrackers 200 can depend, in part, on the volume of hydrocarbon processed through the hydrocracker 200. Since the volume of the light-DAO in line 188 is smaller than the volume of the hydrocarbon feed in line 102, the hydrocracker 200 treating only the light-DAO volume in line 188 can be proportionately smaller than a comparable hydrocracker treating the entire feed volume in line 102. Additionally, since both asphaltenes (via line 134—ref. FIGS. 1 and 2) and heavy-DAO/resins (via line 168—ref. FIG. 2) have been removed upstream of the hydrocracker 200, the hydrocracker can be operated at lower severity, i.e. lower temperature and/or pressure.

In one or more embodiments, the light-DAO and hydrogen can react, polymerize and combine within the one or more hydrocrackers 200 to provide an overhead via line 210 and a bottoms via line 205. The overhead in line 210 can contain, but is not limited to, kerosene, diesel, fuel oils, gasolines, mixtures thereof, derivatives thereof and combinations thereof. containing residuum heavy oils. In one or more embodiments, the temperature in the hydrocracker 200 can range from about 200° C. (390° F.) to about 600° C. (1,110° F.); about 250° C. (480° F.) to about 500° C. (930° F.); or about 280° C. (535° F.) to about 450° C. (840° F.). In one or more embodiments, the pressure in the hydrocracker 200 can range from about 5,000 kPa (710 psig) to about 25,000 kPa (3,610 psig); about 6,000 kPa (855 psig) to about 22,000 kPa (3,175 psig); or about 7,000 kPa (1,000 psig) to about 21,000 kPa (3,030 psig).

Figure 3:
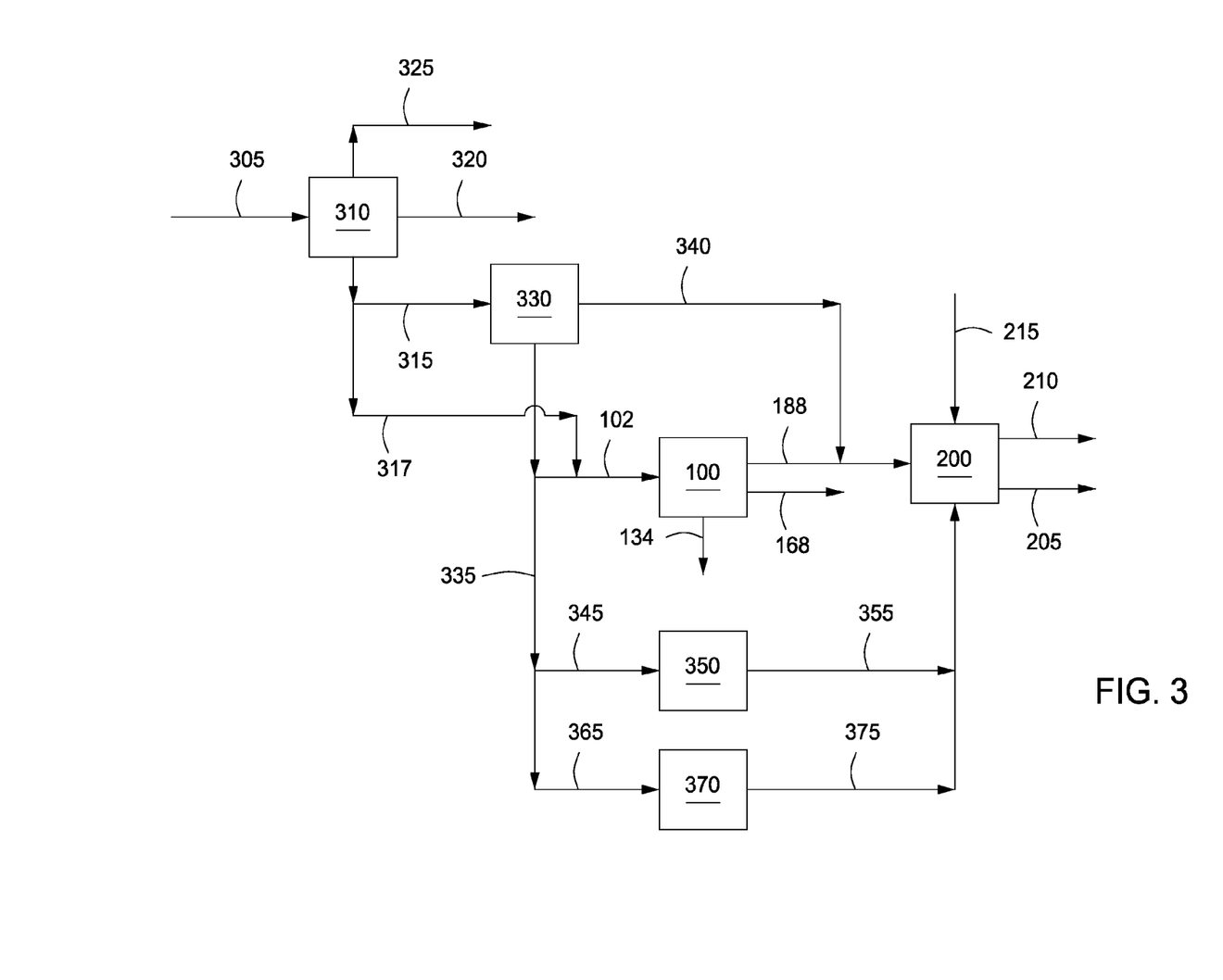
FIG. 3 depicts an illustrative system for upgrading atmospheric residues according to one or more embodiments described.

FIG. 3 depicts an illustrative system for upgrading atmospheric residues according to one or more embodiments. In one or more embodiments, the refining system can include, but is not limited to, one or more atmospheric distillation units ("ADU") 310, one or more vacuum distillation units ("VDU") 330, one or more solvent de-asphalting units ("SDA") 100, one or more cokers 350, one or more crackers 370, and one or more hydrocrackers 200.

In one or more embodiments, one or more hydrocarbons can be introduced via line 305 to one or more atmospheric distillation units 310 to provide light overhead via line 325, an intermediate via line 320, and a bottoms via line 315. In one or more embodiments, the bottoms stream 315 can contain, but is not limited to, hydrocarbons having boiling points ranging from about 290° C. (550° F.) to about 400° C. (750°

F.). In one or more embodiments, at least a portion of the bottoms in line 315 can be introduced to one or more vacuum distillation units ("VDU") 330 to provide a light overhead via line 340, containing vacuum gas oil ("VGO") and a bottoms via line 335. The bottoms in line 335 can contain high boiling point hydrocarbons having high levels of sulfur, nitrogen, metals, and/or Conradson Carbon Residue ("CCR"). In one or more embodiments, the bottoms in line 335 can be apportioned equally or unequally between one or more of the following: one or more solvent deasphalting units 100 via line 102, one or more cokers 350 via line 345, and/or one or more resid hydrocrackers 370 via line 365.

In one or more embodiments, at least a portion of the atmospheric distillation unit bottoms can bypass the vacuum distillation unit 330 and instead be introduced via line 317 directly to the solvent deasphalting unit 100. In one or more embodiments, a minimum of about 0% wt; about 10% wt; about 25% wt; about 50% wt; about 75% wt; about 90% wt; about 95% wt; or about 99% wt of the atmospheric tower bottoms in line 315 can bypass the vacuum distillation unit 330 and be introduced via line 317 directly to the solvent deasphalting unit 100. Within the one or more solvent deasphalting units 100, a substantial portion of the sulfur, nitrogen, metals and/or CCR present in the atmospheric distillation unit bottoms via line 315 can be removed with the asphaltenes via line 134 and/or the heavy-DAO via line 168. The light-DAO via line 188 can therefore contain one or more high-quality hydrocarbons having low levels of sulfur, nitrogen, metals and/or CCR. In one or more embodiments, the light-DAO via line 188 can be introduced to one or more hydrocrackers 200, to provide an overhead via line 210 and a bottoms via line 205.

In one or more embodiments, at least a portion of the VDU bottoms in line 335 can be introduced to one or more cokers 350 via line 345. In one or more embodiments, the coker 350 can thermally crack and soak the VDU bottoms at high temperature, thereby providing one or more light hydrocarbon products via line 355. In one or more embodiments, at least a portion of the VDU bottoms in line 335 can be introduced to one or more resid hydrocrackers 370 via line 365. In one or more embodiments, the resid hydrocracker 370 can catalytically crack the VDU bottoms in the presence of hydrogen, thereby providing one or more light hydrocarbon products via line 375.

In one or more embodiments, the VDU light overhead in line 340, light-DAO in line 188, the one or more light hydrocarbon products in line 355, and the one or more light hydrocarbon product via line 375 can be introduced to the one or more hydrocrackers 200. Within the hydrocracker 200 the combined feed can be catalytically upgraded in the presence of large quantities (i.e. excess stoichiometric quantities) of molecular hydrogen to provide one or more high-value light hydrocarbon products via line 210 and one or more heavy hydrocarbon by-products via line 205.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for processing one or more hydrocarbons, comprising:
    selectively separating one or more hydrocarbons within an atmospheric distillation unit to provide a light overhead, an intermediate, and a first bottoms, wherein the first bottoms comprises one or more asphaltenes, one or more heavy oils, and one or more light oils;
    separating the first bottoms into a first portion and a second portion;
    selectively separating the first portion within a vacuum distillation unit to provide a vacuum gas oil and a second bottoms;
    combining the second portion with one or more solvents to provide a first mixture;
    selectively separating the one or more asphaltenes from the first mixture to provide a second mixture comprising the one or more solvents, one or more heavy deasphalted oils, and one or more light deasphalted oils, wherein the one or more asphaltenes is selectively separated from the first mixture at a temperature that is about 50° C. greater than a critical temperature of the one or more solvents to about 150° C. greater than the critical temperature of the one or more solvents, wherein the one or more asphaltenes has an API gravity at 60° F. ranging from about 5° API to about 30° API;
    selectively separating the one or more heavy deasphalted oils from the second mixture to provide a third mixture comprising the one or more solvents and the one or more light deasphalted oils;
    selectively separating the one or more solvents from the third mixture to recover the one or more light deasphalted oils, wherein the one or more light deasphalted oils has an API gravity at 60° F. ranging from 10° API to about 60° API;
    combining the vacuum gas oil and the one or more light deasphalted oils to provide a fourth mixture; and
    hydrocracking at least a portion of the fourth mixture to provide one or more light hydrocarbon products.

2. The method of claim 1, wherein the one or more light hydrocarbon products comprise kerosene, diesel, gas oil, gasoline, combinations thereof, derivatives thereof, or mixtures thereof.

3. The method of claim 1, wherein the one or more hydrocarbons comprise crude oil, oil shales, oil sands, tars, bitumens, mixtures thereof, or any combination thereof.

4. The method of claim 1, wherein the second portion and the one or more solvents are combined at a temperature ranging from about 25° C. to about 600° C. and a pressure ranging from about 101 kPa to about 2,800 kPa, and wherein the pressure at which the second portion and the one or more solvents are combined exceeds a pressure at which the one or more asphaltenes is selectively separated from the first mixture by a minimum of about 70 kPa.

5. The method of claim 4, wherein a solvent-to-second portion weight ratio ranges from about 2:1 to about 100:1 by weight, and wherein the second portion and the one or more solvents are combined at a pressure that exceeds a pressure at which the one or more asphaltenes is selectively separated from the first mixture by a minimum of about 350 kPa.

6. The method of claim 1, wherein the one or more heavy deasphalted oils is selectively separated from the second mixture at a temperature that is about 50° C. to about 150° C. greater than a critical temperature of the one or more solvents and at a pressure greater than 101 kPa, and wherein the one or more solvents is selectively separated from the third mixture at a temperature that is about 50° C. to about 150° C. greater than a critical temperature of the one or more and at a pressure greater than 101 kPa.

7. The method of claim 1, wherein the at least a portion of the one or more light deasphalted oils is hydrocracked in the presence of a stoichiometric excess quantity of hydrogen at a temperature ranging from about 280° C. to about 450° C. and a pressure ranging from about 7,000 kPa to about 21,000 kPa.

8. The method of claim 1, wherein the one or more heavy deasphalted oils has a viscosity of about 50 cSt to about 170 cSt at a temperature of 50° C., and wherein the one or more light deasphalted oils has a viscosity of about 40 cSt to about 65 cSt at a temperature of 50° C.

9. The method of claim 1, wherein the one or more solvents comprise one or more alkanes, one or more alkenes, or any mixture thereof, and wherein the alkanes and alkenes have from three to seven carbon atoms.

10. The method of claim 1, wherein the second bottoms and the one or more asphaltenes both comprise Conradson Carbon Residue.

11. The method of claim 1, wherein the first portion comprises about 10 wt % to about 90 wt % of the first bottoms.

12. A method for processing one or more hydrocarbons, comprising:
   selectively separating one or more hydrocarbons within an atmospheric distillation unit to provide a light overhead, an intermediate, and a first bottoms, wherein the first bottoms comprises one or more asphaltenes, one or more heavy oils, and one or more light oils;
   separating the first bottoms into a first portion and a second portion;
   selectively separating the first portion within a vacuum distillation unit to provide a vacuum gas oil and a second bottoms;
   combining the second portion with one or more solvents to provide a first mixture, wherein the second portion and the one or more solvents are combined at a temperature ranging from about 25° C. to about 600° C. and a pressure ranging from about 101 kPa to about 2,800 kPa;
   selectively separating the one or more asphaltenes from the first mixture to provide a second mixture comprising the one or more solvents, one or more heavy deasphalted oils, and one or more light deasphalted oils, wherein the one or more asphaltenes is selectively separated from the first mixture at a temperature that is about 50° C. greater than a critical temperature of the one or more solvents to about 150° C. greater than the critical temperature of the one or more solvents, wherein the one or more asphaltenes has an API gravity at 60° F. ranging from about 5° API to about 30° API, and wherein the second portion and the one or more solvents are combined at a pressure that exceeds a pressure at which the one or more asphaltenes is selectively separated from the first mixture by a minimum of about 70 kPa;
   selectively separating the one or more heavy deasphalted oils from the second mixture to provide a third mixture comprising the one or more solvents and the one or more light deasphalted oils, wherein the one or more heavy deasphalted oils is selectively separated from the second mixture at a temperature that is about 50° C. greater than a critical temperature of the one or more solvents to about 150° C. greater than the critical temperature of the one or more solvents;
   selectively separating the one or more solvents from the third mixture to recover the one or more light deasphalted oils, wherein the one or more solvents is selectively separated from the third mixture at a temperature that is about 50° C. greater than a critical temperature of the one or more solvents to about 150° C. greater than the critical temperature of the one or more solvents, and wherein the one or more light deasphalted oils has an API gravity at 60° F. ranging from about 10° API to about 60° API;
   combining the vacuum gas oil and the one or more light deasphalted oils to provide a fourth mixture; and
   hydrocracking at least a portion of the fourth mixture at a temperature ranging from about 280° C. to about 450° C. and a pressure ranging from about 7,000 kPa to about 21,000 kPa to provide one or more light hydrocarbon products.

13. The method of claim 12, wherein a solvent-to-second portion weight ratio ranges from about 2:1 to about 10:1, and wherein a stoichiometric excess quantity of hydrogen is present when the at least a portion of the fourth mixture is hydrocracked.

14. The method of claim 12, wherein the one or more asphaltenes is selectively separated from the first mixture at a pressure of about 101 kPa to about 700 kPa above a critical pressure of the one or more solvents and at a temperature that is about 100° C. to about 150° C. greater than the critical temperature of the one or more solvents.

15. The method of claim 14, wherein the one or more heavy deasphalted oils is selectively separated from the second mixture at a pressure of about 101 kPa to about 700 kPa above a critical pressure of the one or more solvents and at a temperature that is about 100° C. to about 150° C. greater than the critical temperature of the one or more solvents.

16. The method of claim 15, wherein the one or more solvents is selectively separated from the third mixture at a pressure of about 101 kPa to about 700 kPa above a critical pressure of the one or more solvents and at a temperature that is about 100° C. to about 150° C. greater than the critical temperature of the one or more solvents.

17. The method of claim 12, wherein the one or more light hydrocarbon products comprise kerosene, diesel, gas oil, gasoline, combinations thereof, derivatives thereof or mixtures thereof.

18. The method of claim 12, wherein the one or more hydrocarbons comprise crude oil, oil shales, oil sands, tars, bitumens, combinations thereof, derivatives thereof, or mixtures thereof.

19. The method of claim 12, wherein the one or more solvents comprise one or more alkanes, one or more alkenes, or any mixture thereof, and wherein the alkanes and alkenes have from three to seven carbon atoms.

20. The method of claim 12, further comprising:
   thermally cracking the second bottoms to provide a thermally cracked product; and
   combining the thermally cracked product with the one or more light deasphalted oils and the vacuum gas oil to provide the fourth mixture.

21. The method of claim 12, further comprising:
catalytically cracking the second bottoms to provide a catalytically cracked product; and combining the catalytically cracked product with the one or more light deasphalted oils and the vacuum gas oil to provide the fourth mixture.

22. A method for processing one or more hydrocarbons, comprising:
   selectively separating one or more hydrocarbons within an atmospheric distillation unit to provide a light overhead, an intermediate, and a first bottoms, wherein the first bottoms comprises one or more asphaltenes, one or more heavy oils, and one or more light oils;
   splitting the first bottoms into a first portion and a second portion;
   selectively separating the first portion within a vacuum distillation unit to provide a vacuum gas oil and a second bottoms;
   separating the second bottoms into a third portion, a fourth portion, and a fifth portion;
   combining the second portion and the third portion with one or more solvents to provide a first mixture, wherein the second portion, the third portion, and the one or more solvents are combined at a temperature ranging from about 25° C. to about 600° C. and a pressure ranging from about 101 kPa to about 2,800 kPa;
   selectively separating the one or more asphaltenes from the first mixture to provide a second mixture comprising the one or more solvents, one or more heavy deasphalted oils, and one or more light deasphalted oils, wherein the one or more asphaltenes has an API gravity at 60° F. ranging from about 5° API to about 30° API, wherein the one or more asphaltenes is selectively separated from the first mixture at a temperature that is about 50° C. greater than a critical temperature of the one or more solvents to about 150° C. greater than the critical temperature of the one or more solvents, and wherein the second portion, the third portion, and the one or more solvents are combined at a pressure that exceeds a pressure at which the one or more asphaltenes is selectively separated from the first mixture by a minimum of about 140 kPa;
   selectively separating the one or more heavy deasphalted oils from the second mixture to provide a third mixture comprising the one or more solvents and the one or more light deasphalted oils, wherein the one or more heavy deasphalted oils is selectively separated from the second mixture at a temperature that is about 50° C. greater than a critical temperature of the one or more solvents to about 150° C. greater than the critical temperature of the one or more solvents, and wherein the one or more heavy deasphalted oils has a viscosity of about 50 cSt to about 170 cSt at a temperature of 50° C.;
   selectively separating the one or more solvents from the third mixture to recover the one or more light deasphalted oils, wherein the one or more solvents is selectively separated from the third mixture at a temperature that is about 50° C. greater than a critical temperature of the one or more solvents to about 150° C. greater than the critical temperature of the one or more solvents, wherein separating the one or more solvents from the third mixture comprises heating the third mixture with steam, wherein the one or more light deasphalted oils has an API gravity at 60° F. ranging from about 10° API to about 60° API and a viscosity of about 40 cSt to about 65 cSt at a temperature of 50° C.;
   thermally cracking the fourth portion to provide a thermally cracked product;
   catalytically cracking the fifth portion to provide a catalytically cracked product;
   combining the vacuum gas oil, the one or more light deasphalted oils, and at least one of the thermally cracked product and the catalytically cracked product to provide a fourth mixture; and
   hydrocracking at least a portion of the fourth mixture in the presence of a stoichiometric excess quantity of hydrogen at a temperature ranging from about 280° C. to about 450° C. and a pressure ranging from about 7,000 kPa to about 21,000 kPa to provide one or more light hydrocarbon products.

23. The method of claim 22, wherein both the thermally cracked product and the catalytically cracked product are combined with the vacuum gas oil and the one or more light deasphalted oils to provide the fourth mixture.

* * * * *